United States Patent
Yoshizawa et al.

(10) Patent No.: US 6,390,044 B2
(45) Date of Patent: May 21, 2002

(54) APPARATUS AND METHOD FOR FAIL-SAFE CONTROL OF SLIDING MODE CONTROL SYSTEM

(75) Inventors: Hidekazu Yoshizawa; Norio Moteki, both of Atsugi (JP)

(73) Assignee: Unisia Jecs Corporation, Kanagawa-ken (JP)

( * ) Notice: Subject to any disclaimer, the term of this patent is extended or adjusted under 35 U.S.C. 154(b) by 0 days.

(21) Appl. No.: 09/731,820

(22) Filed: Dec. 8, 2000

(30) Foreign Application Priority Data

Dec. 10, 1999 (JP) ............................................ 11-351142

(51) Int. Cl.[7] ................................................. F01L 1/34
(52) U.S. Cl. ...................... 123/90.17; 74/568 R; 464/1; 464/2; 464/160
(58) Field of Search .......................... 123/90.15, 90.16, 123/90.17, 90.18, 198 D; 74/568 R; 464/1, 2, 160, 161

(56) References Cited

U.S. PATENT DOCUMENTS

| | | | | |
|---|---|---|---|---|
| 5,537,961 A | * | 7/1996 | Shigeru | 123/90.15 |
| 5,611,304 A | * | 3/1997 | Shinojima | 123/90.15 |
| 6,006,707 A | * | 12/1999 | Ito | 123/90.15 |

FOREIGN PATENT DOCUMENTS

JP    10-141022    5/1998

* cited by examiner

*Primary Examiner*—Thomas Denion
*Assistant Examiner*—Jaime Corrigan
(74) *Attorney, Agent, or Firm*—McDermott, Will & Emery

(57) ABSTRACT

A valve timing control apparatus in an internal combustion engine is feedback controlled by a sliding mode control and an abnormality of the sliding mode control is diagnosed. During a slight abnormality other than a crucial abnormality which makes the feedback control impossible, the system is feedback controlled to converge to a target value using only a non-linear term calculated by the sliding mode control.

12 Claims, 11 Drawing Sheets

APPARATUS AND METHOD FOR FAIL-SAFE CONTROL OF SLIDING MODE CONTROL SYSTEM

FIELD OF THE INVENTION

The present invention relates to technology of a fail-safe control of a sliding mode control system, for example, to technology for performing a fail-safe control at an abnormal time of a sliding mode control system used for feedback controlling a rotation phase of a camshaft relative to a crankshaft to a target value.

BACKGROUND OF THE INVENTION

A conventional valve timing apparatus is known as a vane type valve timing controlling apparatus disclosed in Japanese Unexamined Patent Publication 10-141022 such as an apparatus for successively changing opening and closing timing of intake and exhaust valves by changing rotation phase of a camshaft relative to a crankshaft.

This apparatus forms concave portions in the inner surface of a cylindrical housing fixed to a cam sprocket in which vanes of an impeller are accommodated in the concave portions so that the camshaft can rotate relative to the cam sprocket within the range where the vanes of the impeller can move in the concave portions.

By relatively supplying and discharging oil into a pair of oil pressure chambers formed by defining the concave portions in the front and the rear of the rotation direction, the vanes are held in the mid position of the concave portions and thus successive changing of rotation phase can be carried out. Thus, supply and discharge of the oil is feedback controlled by PID control so that a rotation phase of a control object corresponds to a target value.

When the rotation phase cannot be controlled to the target value in the above valve timing control apparatus, the operation performance of an engine is deteriorated. Therefore, in the conventional valve timing apparatus, a fail-safe control has been performed for diagnosing the existence of abnormality and for controlling the rotation phase of the camshaft relative to the crankshaft to the most retarded side when the occurrence of abnormality is diagnosed.

However, the above fail-safe control for controlling the rotation phase to the most retarded side is of an inappropriate constitution, since only a minimum operation performance can be achieved.

Further, it is preferable to variably set a feedback gain in accordance with an oil temperature and an oil pressure in order to execute the PID control with a good response characteristic. However, gain matching is not easily performed. Accordingly, the shift from the general PID control to a sliding mode control with small disturbance is being investigated.

SUMMARY OF THE INVENTION

In view of the foregoing, the present invention has been achieved and has an object of carrying out a fail-safe control capable of maintaining high performance as possible on abnormality of a control system.

Another object of the present invention is to carry out a fail-safe control corresponding to the types and degree of abnormality of a control system.

In order to achieve the above objects, the present invention comprises the following constitution in a system for feedback controlling a control object to a target value by calculating a control amount composed of a linear term and a non-linear term by a sliding mode control.

It is judged whether or not an abnormality occurs in the system.

When it is judged that the system is abnormal, a feedback control is carried out using only a non-linear term calculated by the sliding mode control.

According to this constitution, by using only the non-linear term, the feedback control is carried out at a slower speed than in a normal time. As a result, a filter function is generated to instantaneous breakdown, noises, and fluctuations of control signal, so that the control object can be converged to the target value to achieve a desired performance restraining abrupt fluctuations, while restraining abrupt fluctuations.

Also, the constitution may be such that the feedback control may be carried out using the non-linear term only when it is judged that the sliding mode control system is in a predetermined abnormal state.

According to this constitution, at an abnormal state where the feedback control cannot be carried out due to a steady failure such as a break down of control signal, the fail-safe control is carried out by a feedforward control. Only when the feedback control can be carried out, the feedback control is carried out using only the non-linear term. Thereby, the feedback control can be carried out according to a degree of abnormality.

Further, the constitution may be such that the predetermined abnormality includes an abnormality which occurs transiently.

According to this constitution, the feedback control can be carried out using only the non-linear term to the abnormality which occurs transiently, such as instantaneous breakdown and noises of control signal.

Accordingly, the control object can be feedback controlled to the target value while preventing abrupt fluctuations or operating errors caused by the abnormality occurring transiently.

Also, the predetermined abnormality may include an abnormality where a deviation between the target value and the actual value of the control object exceeds a threshold value for a predetermined time or above.

According to this constitution, when a good response is not obtained, the feedback control using only the non-linear term can be carried out to secure the good performance while preventing abrupt fluctuations.

The control object may be a rotation phase of a camshaft relative to a crankshaft of an internal combustion engine wherein the opening and closing timing of an intake valve and an exhaust valve is controlled variably and continuously by feedback controlling the rotation phase to a target value.

In this way, in a constitution wherein the valve timing is continuously changed by changing the rotation phase of the camshaft relative to the crankshaft, the valve timing (substantial control object) is feedback controlled to a target value by a sliding mode control and also the presence of abnormality is judged to carry out the feedback control by using only the non-linear term at the time of occurrence of abnormality.

Only when it is judged that there is a slight abnormality in a sliding mode control system in which the control object is the rotation phase of the camshaft relative to the crankshaft of the internal combustion engine, the feedback control using only the non-linear term is carried out. When it is judged that the sliding mode control system has a crucial abnormality, the rotation phase of the camshaft may be controlled fixedly to the most retarded side.

In this way, when the system has a slight abnormality such as an instantaneous breakdown, noises and a bad response of signal necessary for detection of the rotation phase of the camshaft, the feedback control using only the non-linear term is carried out. When the system has an abnormality wherein it is impossible to carry out the feedback control due to a steady failure such as a breakdown of signal, the rotation phase of the camshaft can be controlled fixedly to the most retarded side to secure the required minimum performance.

The other objects and features of this invention will become understood from the following description with reference to the accompanying drawings.

EMBODIMENT

Figure 1:
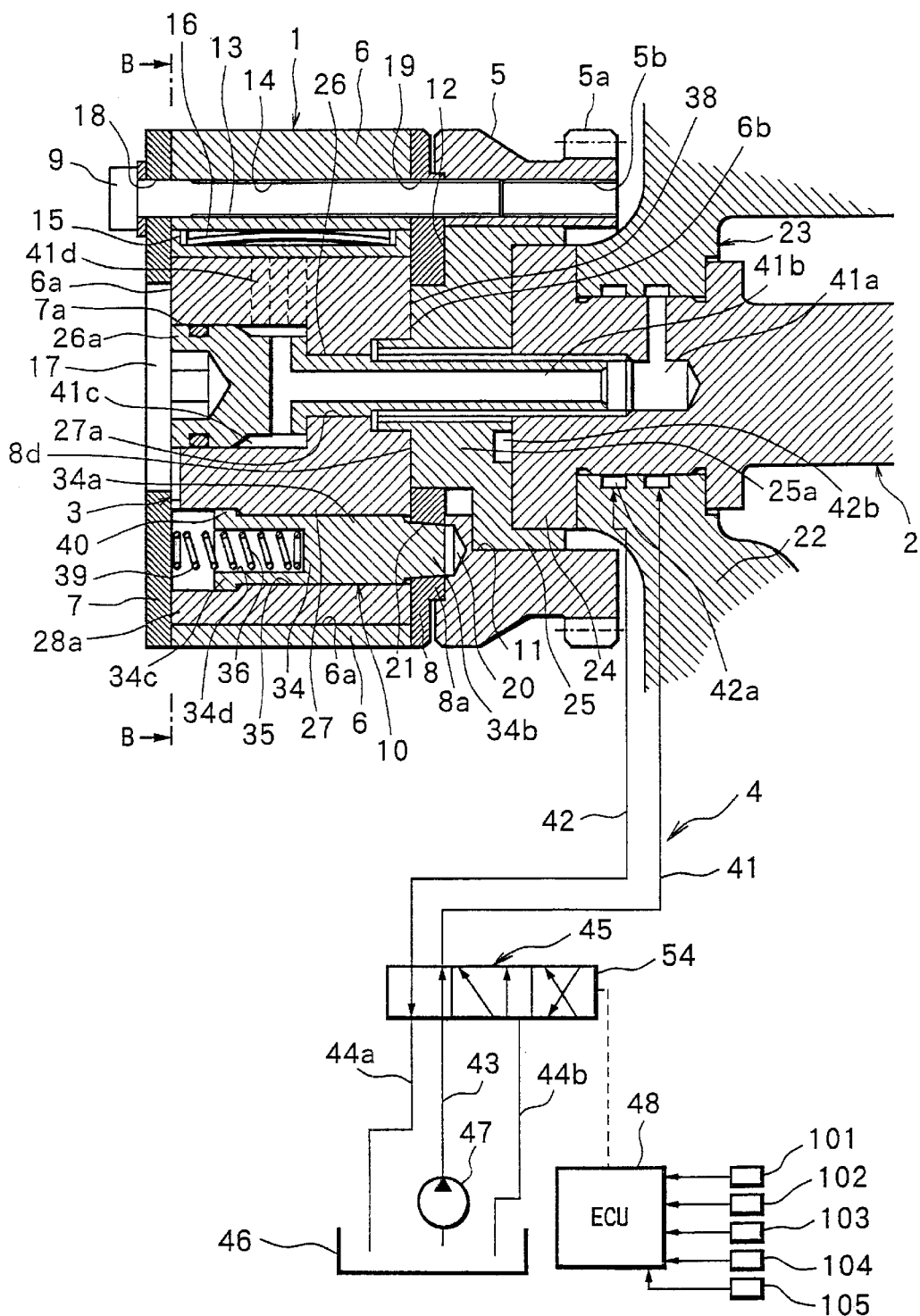
FIG. 1 is a cross sectional view of a valve timing control mechanism in common with each embodiment.
Figure 2:
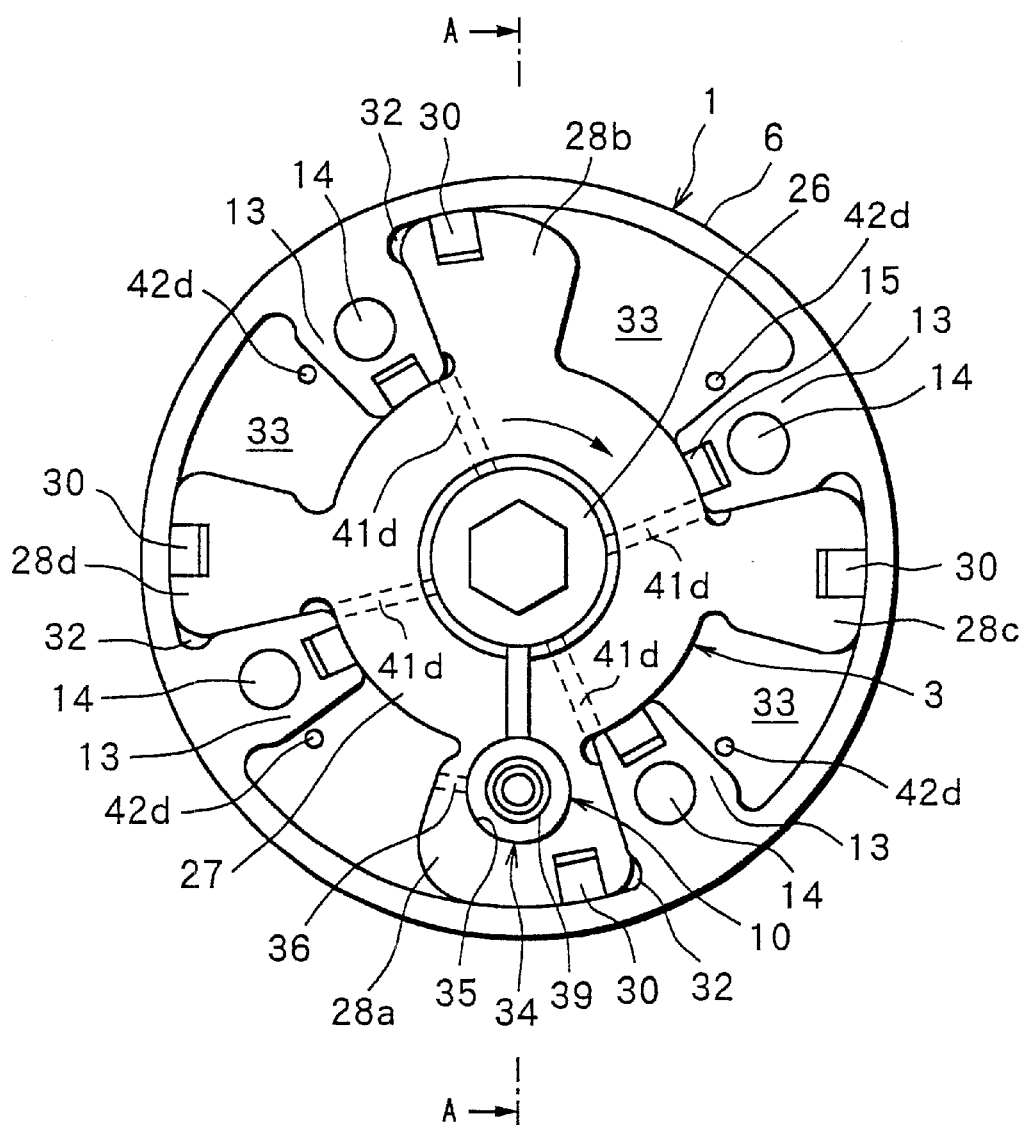
FIG. 2 is a cross sectional view taken on line B—B in FIG. 1.
Figure 3:
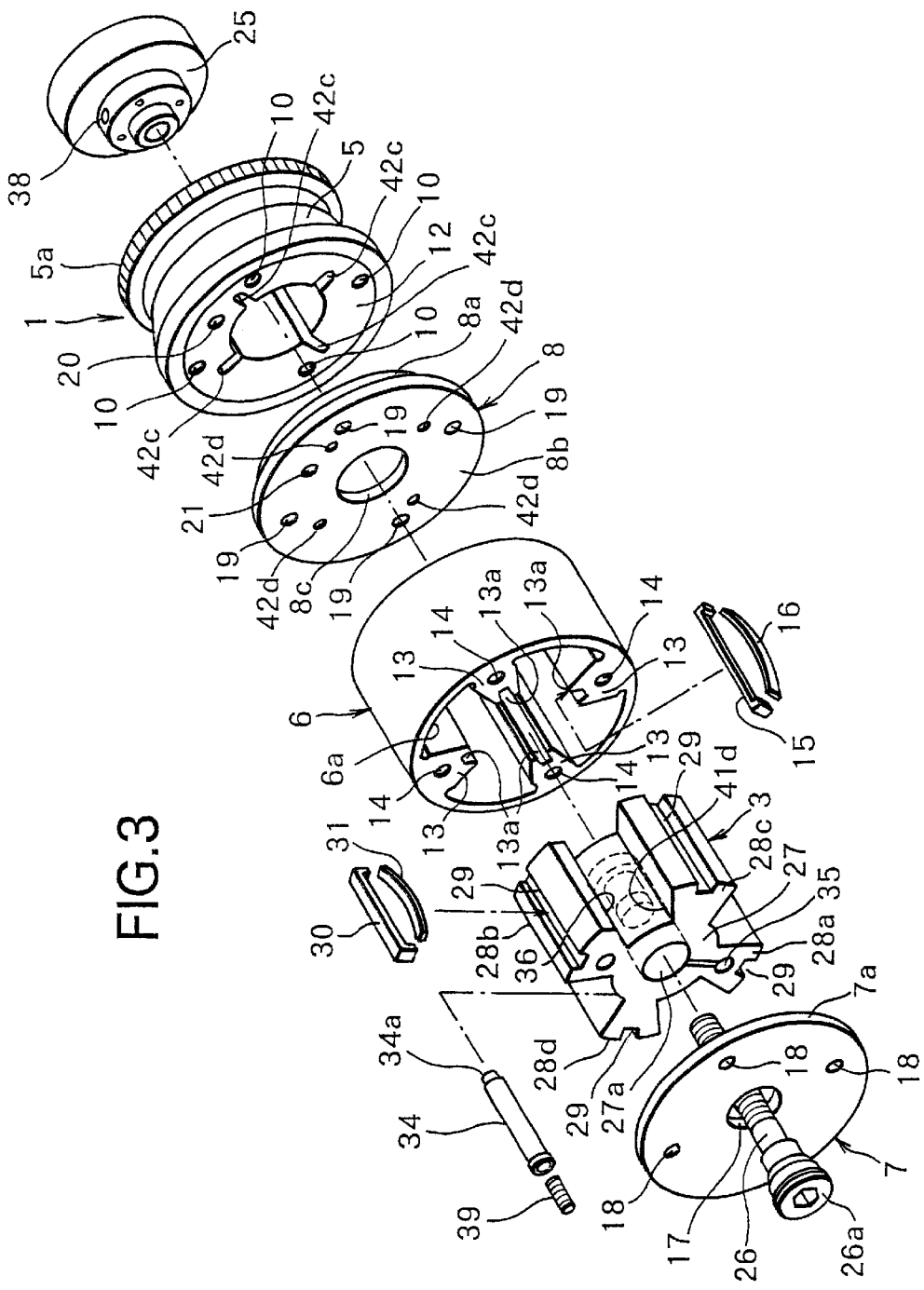
FIG. 3 is an exploded perspective view of the valve timing control mechanism.

Embodiments of the present invention will be explained as follows.

FIG. 1~FIG. 6 show mechanical portions of a valve timing control apparatus in an internal combustion engine wherein the feedback control is carried out by a sliding mode control, applied to an intake valve side.

The valve timing control apparatus as shown in the figures is equipped with a cam sprocket 1 (timing sprocket) driven to rotate through a timing chain by a crankshaft of an engine (not shown), a camshaft 2 mounted rotatably relative to the cam sprocket 1, a rotation member 3 fixed to an end of the camshaft 2 to be received rotatably in the cam sprocket 1, an oil pressure circuit 4 rotating the rotation member 3 relative to the cam sprocket 1, and a lock mechanism 10 selectively locking a relative rotation position of the cam sprocket 1 and the rotation member 3 at a predetermined position.

The cam sprocket 1 includes a rotation portion 5 having a tooth portion 5a on its periphery with which the timing chain (or timing belt) meshes, a housing 6 disposed in the front of the rotation portion 5 to rotatably receive the rotation member 3, a disc-shaped front cover 7 which functions as a lid for closing a front end of the housing 6 and a substantially disc-shaped rear cover 8 disposed between the housing 6 and the rotation portion 5 to close a rear end of the housing 6. The rotation portion 5 is joined integrally with the housing 6, the front cover 7, and the rear cover 8 by four small diameter bolts 9 in an axial direction.

The rotation portion 5 has a substantially annular shape in which four female screw bores 5b are through formed in the front-rear direction at equally spaced positions of 90 degrees in its peripheral direction and the small diameter bolts 9 are screwed to these female screw bores 5b, and also in the internal and central position of the rotation portion 5, a stepped fitting bore 11 is through formed into which a sleeve 25 for forming a passage to be described later is fitted. Moreover, at the front end of the rotation portion 5, a disc-shaped fitting groove 12 is formed into which the rear cover 8 is fitted.

The housing 6 has a cylindrical shape with the front and rear ends opened, and at 90 degree positions in the peripheral direction of the inner peripheral surface thereof, four partition walls 13 are formed projectingly. The partition walls 13 are formed in trapezoidal shapes in cross section and disposed along the axial direction of the housing 6 and both ends of each of the walls 13 are flush with both ends of the housing 6. At the base end side of the housing, four bolt through holes 14 are through formed in the axial direction into which the small diameter bolts 9 are inserted. Further, at the central position of the internal face of each of walls 13, a cutout retaining groove 13a is formed within which C-shaped sealing member 15 and a plate spring 16 urging the sealing member 15 inwards are held fittedly.

Further, the front cover 7 is formed with a relatively large diameter bolt through hole 17 at its center and four bolt through holes at the positions corresponding to the respective bolt through holes 14 in the housing 6.

The rear cover 8 is formed with a disc portion 8a held fittedly within the fitting groove 12 of the rotation portion 5 at the rear end thereof, an insert hole 8c into which a small diameter annular portion 25a is inserted at the center thereof and further four bolt through holes 19 at the positions corresponding to the bolt through holes 14.

The camshaft 2 is supported rotatably through a cam bearing 23 at the tip end portion of a cylinder head 22, and at a predetermined position in the outer peripheral surface of the camshaft 2, a cam (not shown in the figures) is integrally mounted to open an intake valve through a valve lifter and a flange portion 24 is integrally mounted to its front end portion.

The rotation member 3 is fixed to the front end of the camshaft 2 through a fixing bolt 26 inserted in the axial direction through the sleeve 25 with the front and rear ends thereof fitted into the flange portion 24 and the fitting bore 11, respectively, and is equipped with an annular base portion 27 having a bolt through hole 27a receiving the fixing bolt 26 at the center thereof and with four vanes 28a, 28b, 28c, and 28d integrally mounted at 90 degree positions in the outer peripheral surface of the base portion 27.

Each of the first to fourth vanes (28a~28d) has a substantially inverted trapezoidal shape in cross section and disposed in the concave between each of partition walls 13 to define the front concave and the rear concave in the rotation direction. An advance pressure chamber 32 and a retard pressure chamber 33 are defined between both sides of vanes 28a~28d and both sides of partition walls. Sealing members 30 with C-shape in slide contact with an inner surface 6a of the housing 6 and plate springs 31 urging the sealing members 30 outwards are held and inserted in retaining grooves 29 cut-out in the axial direction at the center of the peripheral surface of each of vanes 28a~28d.

The lock mechanism 10 includes an engagement groove 20 formed at a predetermined outward position of the fitting groove 12 of the rotation portion 5, a tapered engagement bore 21 penetrated at a predetermined position of the rear cover 8 corresponding to the engagement 20, a bore 35 for slide penetrated along the internal axial direction at substantially central position of one of vanes 28 corresponding to the engagement bore 21, a lock pin 34 disposed slidably in the bore 35 of one of the vanes 28, a coil spring 39 in compressive state disposed at the rear end of the lock pin 34 and an oil pressure receiving chamber 40 formed between the lock pin 34 and the bore 35.

The lock pin 34 includes an intermediate diameter lock body 34a at its middle, a conical engagement portion 34b with its front head being smaller in diameter at the front side of the lock body 34a and a stepped, large diameter stopper portion formed on the rear end of the lock body 34a. The lock pin 34 is urged in the direction of the engagement bore 21 by the spring force of the coil spring 39 disposed in compressive state between the bottom surface of a concave groove 34d and an inner end surface of the front cover 7, and is slidable in the direction of it being taken out from the engagement bore 21 by the oil pressure of the oil pressure receiving chamber 40 defined between a peripheral surface between the body 34a and the stopper portion 34c and the inner surface of the bore 35 for slide. This chamber 40 is in communication with the retard oil pressure chamber 33 through a penetrating bore 36 formed in the side of the vane 28. The engagement portion 34b of the lock pin 34 enters into and is in engagement with the engagement bore 21 at the maximum retard rotation position.

The oil pressure circuit 4 includes a first oil pressure passage 41 which supplies and discharges oil pressure to the advance oil pressure chamber 32 and a second oil pressure passage 42 which supplies and discharges oil to the retard oil pressure chamber 33, that is two lines of the oil pressure passages. These oil pressure passages 41, 42 both are connected with a supply passage 43 and a drain passage 44 respectively through an electromagnetic switching valve 45 for passage switching. The supply passage 43 is equipped with an oil pump 47 for supplying oil in an oil pan under pressure while a downstream end of the drain passage 44 is connected with the oil pan.

The first oil pressure passage 41 includes a first passage portion 41a formed in the cylinder head 22 and in the axis of the camshaft 2, a first oil path 41b which branches off in the head portion 26a through an axial direction of a fixing bolt 26 and communicates with the first passage portion 41a, an oil chamber 41c which is formed between a small diameter outer peripheral surface of the head portion 26a and an inner peripheral surface of a bolt insert hole 27a in the base portion 27 of the rotation member 3 to communicate with the first oil path 41b and four branch paths 41d which are formed in radial directions in the base portion 27 of the rotation member 3 to communicate with the oil chamber 41c and each of advance oil pressure chambers 32.

On the other hand, the second oil pressure passage 42 includes a second passage portion 42a in the cylinder head 22 and in an inner one side of the camshaft 2, a second oil path 42b which is formed in a substantially L-shape inside of the sleeve 25 to communicate with the second passage portion 42a, four oil passage grooves 42c which are formed at an outer peripheral side bore edge of the engagement bore 11 of the rotation member 5 to communicate with the second oil path 42b and four oil bores 42d which are formed at approximately 90 degree positions in a circumferential direction of the rear cover 8 to communicate each of the oil passage grooves 42c with the retard oil pressure chamber 33.

In the electromagnetic switching valve 45, a spool valve body of the valve 45 switches each of the oil pressure passages 41, 42 and the supply passage 43 and the drain passages 44a, 44b relatively. Further, the electromagnetic switching valve 45 is switchingly operated by a control signal from a controller 48.

Figure 4:
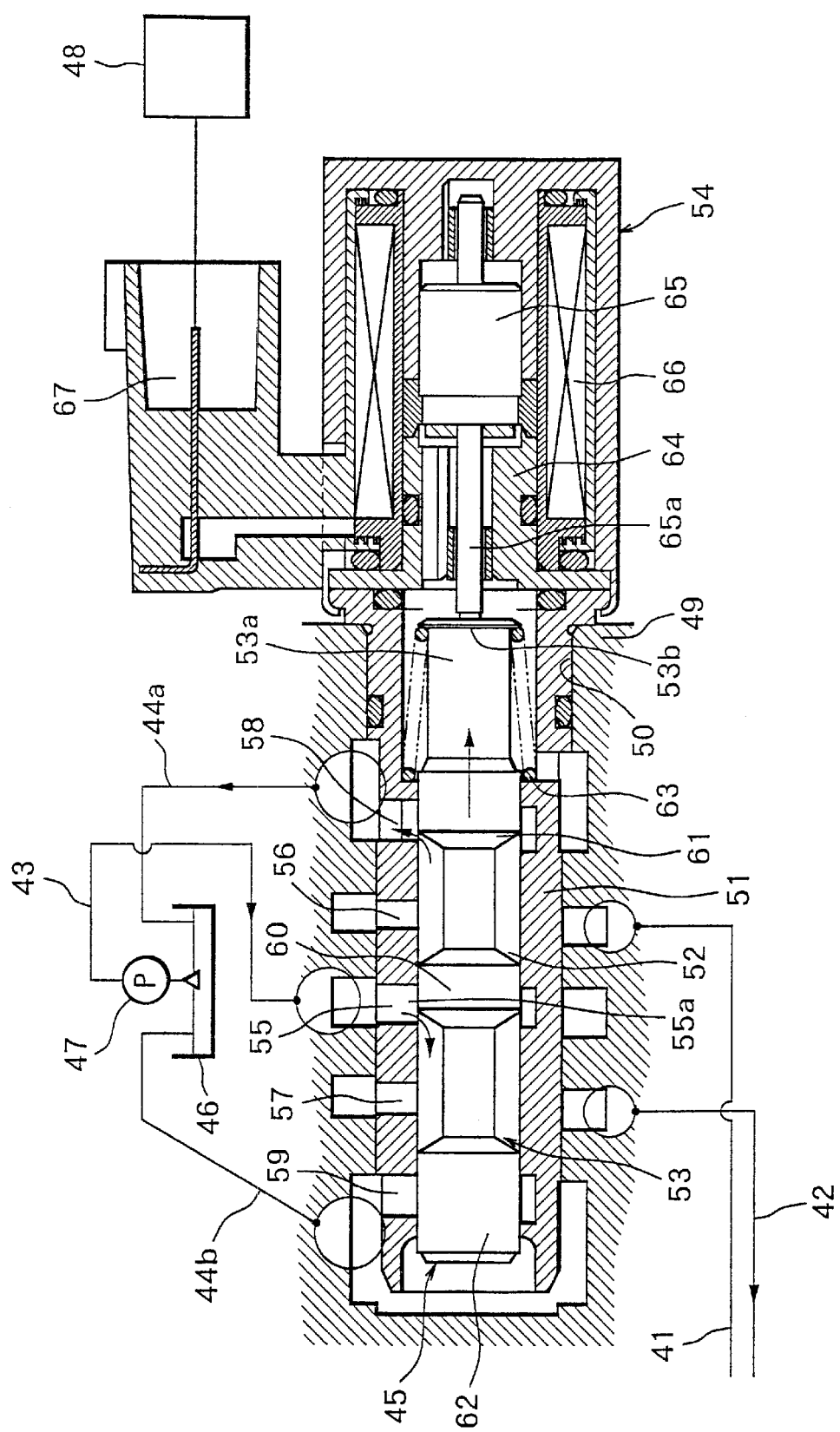
FIG. 4 is a longitudinal sectional view showing an electromagnetic switching valve in the valve timing control mechanism.
Figure 5:
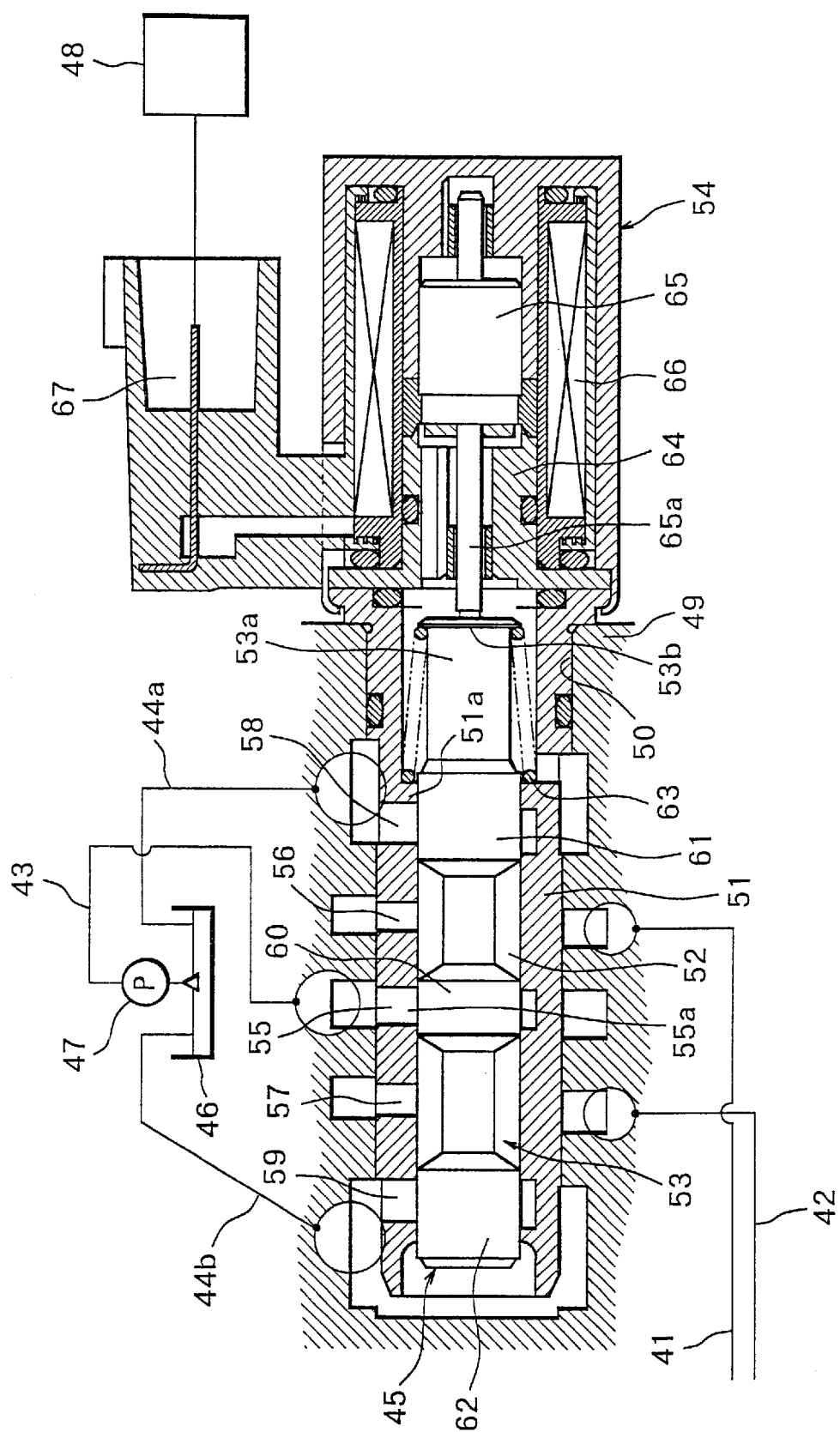
FIG. 5 is a longitudinal sectional view showing an electromagnetic switching valve in the valve timing control mechanism.
Figure 6:
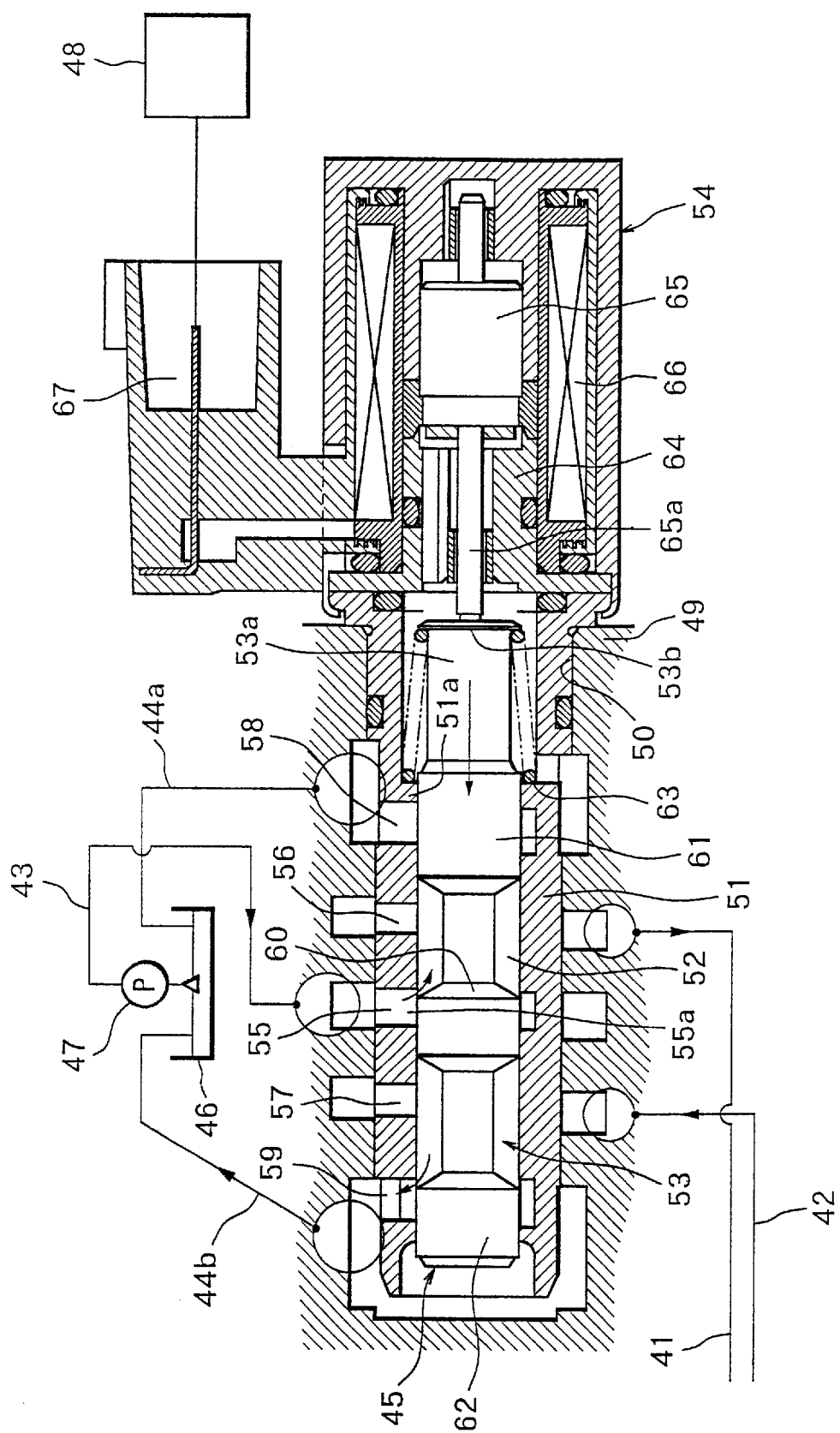
FIG. 6 is a longitudinal sectional view showing an electromagnetic switching valve in the valve timing control mechanism.

In more detail, as shown in FIG. 4 to FIG. 6, the electromagnetic switching valve includes a cylindrical body 51 inserted into and fixed to a holding bore 50 of the cylinder block 49, a spool valve body 53 which is slidable inside a valve bore 52 of the valve body 51 and switches flow path, and a proportional solenoid electromagnetic actuator 54 operating the spool valve body 53.

The valve body 51 includes a supply port 55 penetrated at the substantially central position of the peripheral wall therein which makes communication between a downstream end of the supply passage 43 and the valve bore 52, and a first port 56 and a second port 57 penetrated therein at both sides of the supply port 55 communicating other ends of the first oil pressure passage 41 and the second oil pressure passage 42 and the valve bore 52. At both ends of the peripheral wall a third port 58 and a fourth port 59 are penetrated communicating both drain passages 44a and 44b and the valve bore 52.

The spool valve body 53 includes a substantially cylindrical first valve portion 60 opening and closing the supply port 55 at the center of a small diameter axis and substantially cylindrical second, third valve portions 61, 62 at its ends therein opening and closing the third port and the fourth port 58, 59. The spool valve body 53 is urged in the right direction of the figure by a conical valve spring 63 disposed in compressive state between a cap portion 53b in one end of a support axis 53a at its front end and a spring sheet 51a at an inner wall of the front end of the valve bore 52 so that at the first valve portion 60 the supply port 55 and the second oil pressure passage 42 are communicated.

The electromagnetic actuator 54 is equipped with a core 64, a moving plunger 65, a coil 66, a connector 67 and the like. At the front end of the moving plunger is fixed a driving rod 65a pressing a cap portion 53b of the spool valve body 53.

The controller 48 detects present operating conditions (load, rotation) by a signal from a rotation sensor 101 detecting an engine rotation speed and by a signal from an airflow meter 102 detecting an intake air amount, and detects rotation phase of the camshaft 2 relative to the crankshaft, that is, relative position of the rotation direction of the cam sprocket 1 and the camshaft 2 by signals from the crank angle sensor 103 and the cam sensor 104.

The controller 48 controls electricity to the electromagnetic actuator 54 based on a duty control signal.

For example, when the controller 48 outputs a control signal (off signal) with a duty ratio of 0% to the electromagnetic actuator 54, the spool valve body 53 moves to the right direction at a maximum by spring force of the valve spring 63 as shown in FIG. 4. By this the first valve portion 60 opens an opening end 55a of the supply port 55 for communicating with the second port 57 and at the same time the second valve portion 61 opens an opening end of the third port 58 and the fourth valve portion 62 closes the fourth port 59. Therefore, operating oil pressurized from a oil pump 47 is sent to the retard oil pressure chamber 33 through the supply port 55, a valve port 52, the second port 57 and the second oil pressure passage 42 and operating oil of the advance oil pressure chamber 32 is discharged to the oil pan 46 from the first drain passage 44a through the first oil pressure passage 41, the first port 56, a valve bore 52, and the third port 58.

Accordingly as an inner pressure of the retard oil pressure chamber 33 is high and that of the advance oil pressure chamber 32 is low, the rotation member 3 rotates in one direction at a maximum through the vanes 28a to 28d. With this, the cam sprocket 1 and the camshaft 2 rotates one side relatively and change their phase, resulting in that an opening time of the intake valve is delayed and overlapping with the exhaust valve gets smaller.

On the other hand, when the controller 48 outputs a control signal (ON signal) with a duty ratio of 100% to the electromagnetic actuator 54, the spool valve body 53 slides in the left direction at a maximum against spring force of the valve spring 63 as shown in FIG. 6, the third valve portion 61 closes the third port 58, and at the same time the fourth valve portion 62 opens the fourth valve port 59 and the first valve port 60 communicates the supply port 55 and the first port 56. Therefore, the operating oil is supplied to the advance oil pressure chamber 32 through the supply port 55, the first port 56, and the first oil pressure passage 41. And the operating oil of the retard oil pressure chamber 33 is discharged to the oil pan 46 through the second oil pressure passage 42, the second port 57, the fourth port 59, and the second drain passage 44b. The oil pressure of the retard oil pressure chamber 33 gets lower.

Therefore, the rotation member 3 rotates in the other direction at a maximum through the vanes 28a to 28d, by which the cam sprocket 1 and the camshaft 2 rotate in the other side relatively and change their phase, resulting in that opening timing of an intake valve gets earlier (advanced) and overlapping with an exhaust valve gets larger.

The controller 48 makes as base duty ratio the duty ratio at the position where the first valve portion 60 closes a supply port 55, the third valve portion 61 closes the third port 58, and the fourth valve portion 62 closes the fourth port 59 and on the other hand sets a feedback correction component duty by sliding mode control to make relative position of rotation (rotation phase) between the cam sprocket 1 and the camshaft 2 detected based on signals from a crank angle sensor 103 and a cam sensor 104 to be in accordance with a target value (target advance value) of the relative position of rotation (rotation phase) set corresponding to operating conditions, and makes a final duty ratio (VTCDTY) an additional result of the base duty ratio (BASEDTY) and the feedback correction component (UDTY) and outputs control signal of the duty ratio (VTCDTY) to the electromagnetic actuator 54.

In addition, the base duty ratio (BASEDTY) is set at about a central value (for example, 50%) in the duty range within which the supply port 55, the third port 58 and the fourth port 59 all close and there is no supply and no discharge of oil in both of the oil pressure chambers 32, 33.

That is, in the case the relative position of rotation (rotation phase) is required to change into the direction of retard, the duty ratio decreases by feedback correction component (UDTY), operating oil pressurized from an oil pump 47 is supplied to the retard oil pressure chamber 33, and operating oil of the advance oil pressure chamber 32 is discharged to the oil pan 46. On the other hand, in the case the relative position of rotation (rotation phase) is required to change into the direction of advance, the duty ratio increases by the feedback correction component (UDTY), operating oil is supplied to the advance oil pressure chamber 32, and operating oil of the retard oil pressure chamber 33 is discharged to the oil pan 46. In the case of holding the relative position of rotation at the then-state, with reduction of an absolute value of the feedback correction component (UDTY), the duty ratio is controlled to be back close to the base duty ratio and closing of the supply port 55, the third port 58, and the fourth port 59 (cease of supply and discharge of oil pressure) functions to hold the inner pressure of each of the oil pressure chambers 32, 33.

The feedback correction component (UDTY) will be calculated by sliding mode as follows. In the following the relative position of rotation (rotation phase) between a cam sprocket 1 and a camshaft 2 to be detected will be explained as an actual angle of a valve timing control apparatus (VTC) and its target value will be explained as a target angle of VTC.

Figure 7:
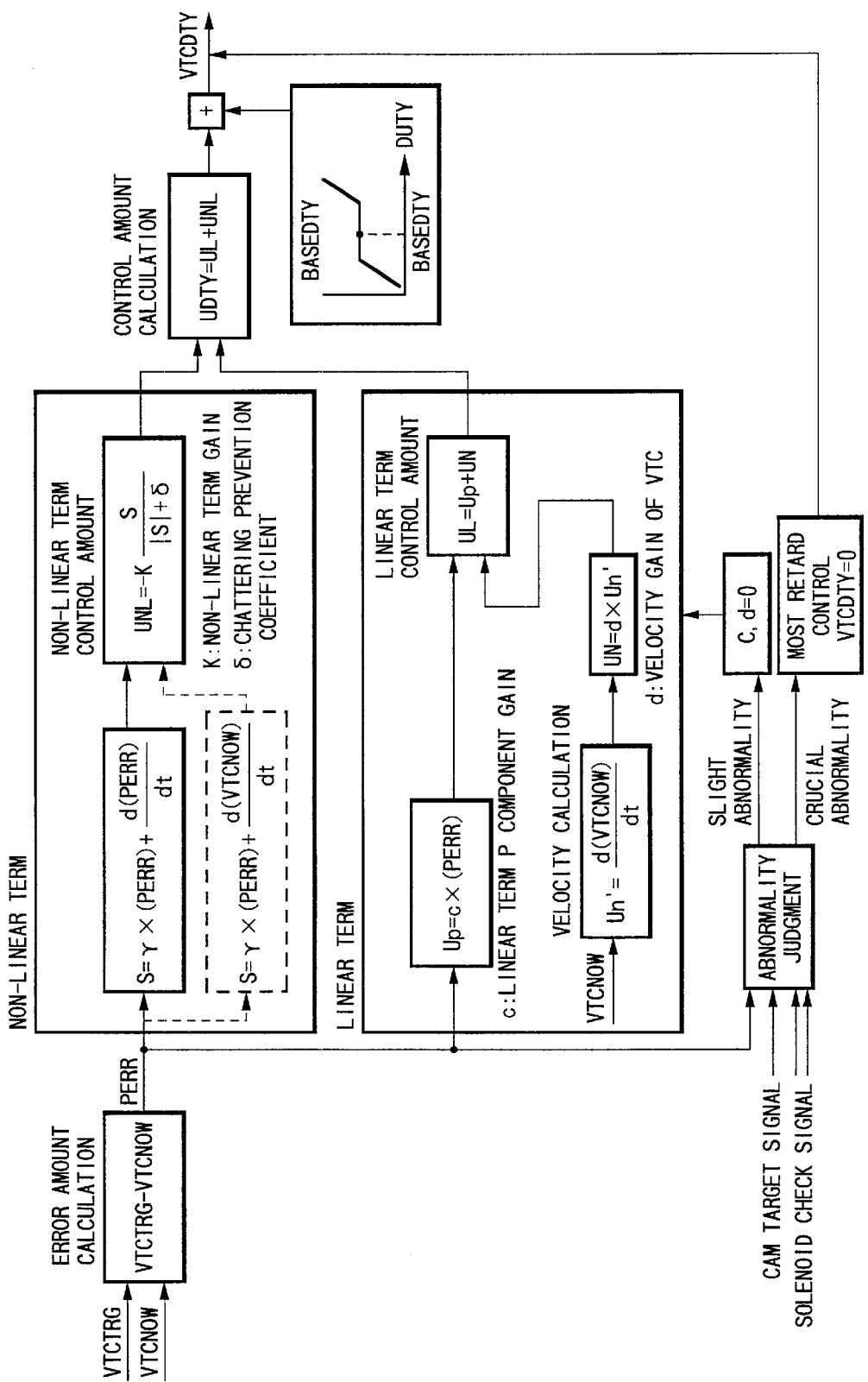
FIG. 7 is a control block diagram of the above valve timing control mechanism.

FIG. 7 is a block diagram showing a state of duty control of the electromagnetic actuator 54 by the above controller 48 to which the sliding mode control designed as mentioned above is applied (including a fail-safe control function according to the present invention described later).

A deviation PERR between a target angle VTCTRG and an actual angle VTCNOW is calculated. Then, a linear term UL (UL=UP+UNL) is calculated by adding a proportional component Up obtained by multiplying the deviation PERR by P component gain c to a velocity component UN obtained by multiplying a differential value of the actual angle VTCNOW by a velocity gain d.

A switching function S is calculated by adding a value obtained by multiplying the deviation PERR by an inclination γ to the differential value d (PERR)/dt of the deviation PERR to calculate a non-linear term UNL as a smoothing function $-kS/(|S|+\delta)$ using the switching function S.

Figure 8:
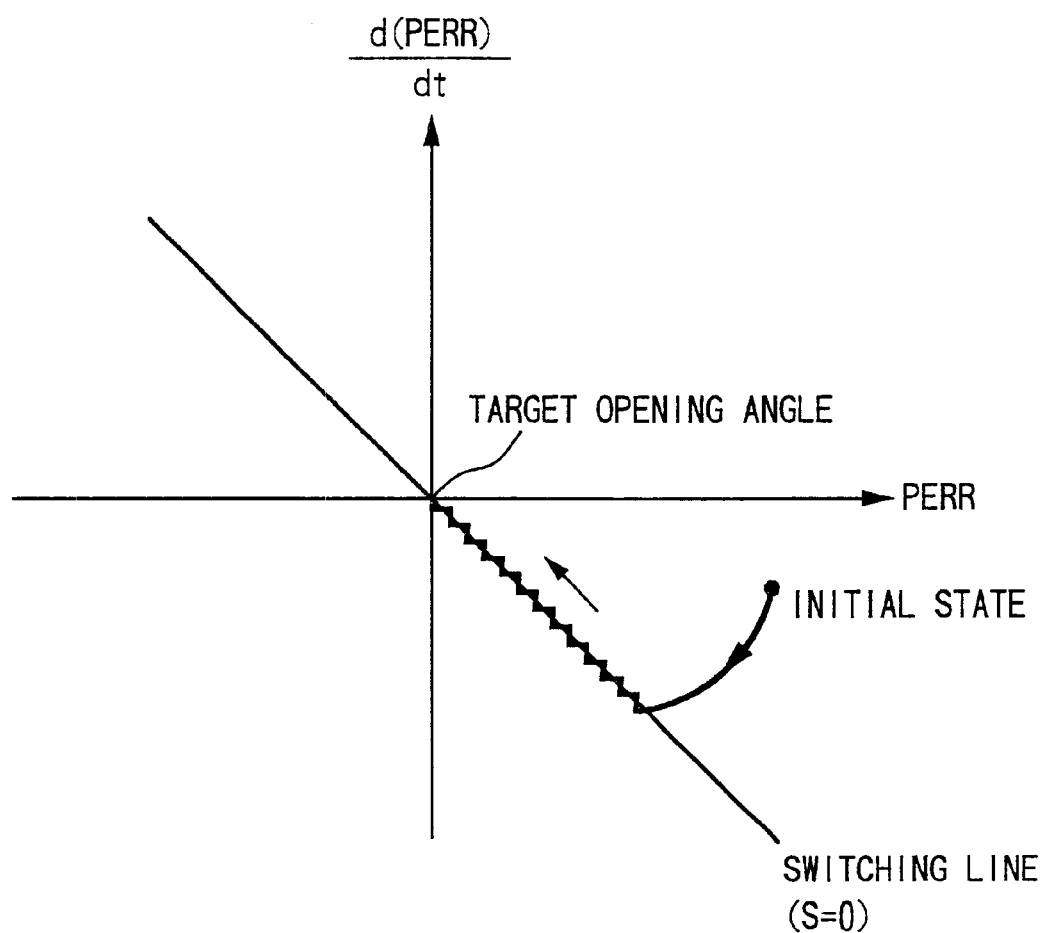
FIG. 8 is a time chart showing a state of convergence to a target angle during a sliding mode control of the above valve timing control apparatus.

In the smoothing function, k is a non-linear term gain and δ is a chattering prevention coefficient The above linear term UL moves the state of control system along the switching line (S=0) toward a target value. The non-linear term UNL directs the state of control system to the switching line to bind it on the switching line. Thereby, the state of control system is moved from an initial state to the switching line on the phase plane. When getting on the switching line, the state of control system reaches an original point (target value) while sliding boundedly on the switching line (see FIG. 8).

A feedback correction component UDTY is calculated by adding the linear term UL and the non-linear term UNL. Then, the feedback correction component UDTY is added to a base duty ratio BASEDTY equivalent to a dead band central position, to output the added result as a final duty ratio VTCDTY.

Thus, since a feedback correction amount is calculated by the sliding mode control and a feedback gain is switched to lead the state of control system on the preset switching line, a high robust control can be carried out with fewer influences caused by variations in the dead band of the switching line and disturbances by oil temperature and oil pressure. Consequently, the machining accuracy of parts can be lowered and also the machining cost can be reduced.

Next, a fail-safe control during an abnormality in a feedback control system of valve timing by the above sliding mode control will be explained.

Figure 9:
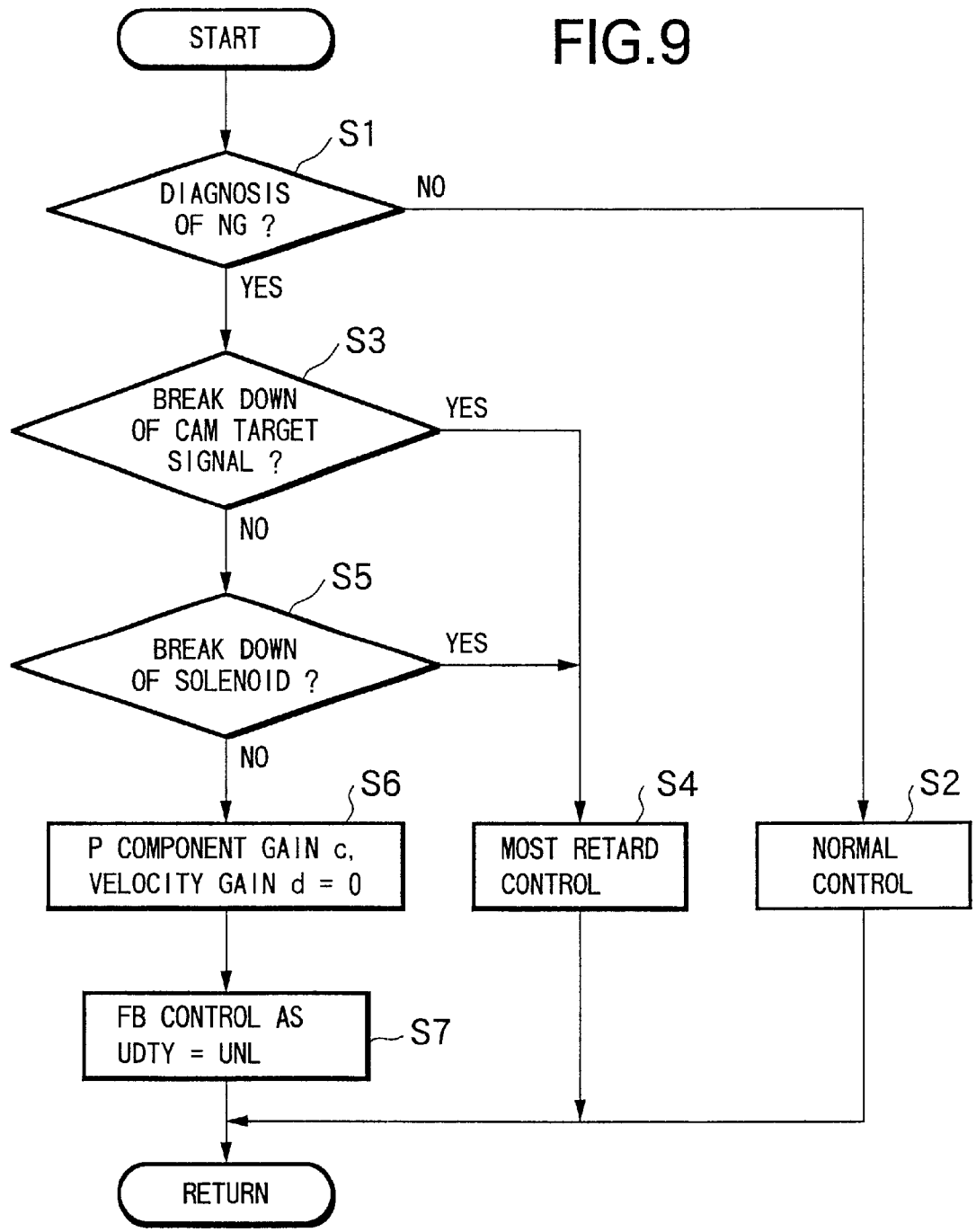
FIG. 9 is a flowchart showing a fail-safe control at the time of an abnormality of the valve timing control mechanism.

A flowchart in FIG. 9 illustrates an embodiment of fail-safe control.

In step 1, an abnormality diagnosis result of valve timing control system is read to judge whether or not an abnormality occurs (NG).

When it is judged that there is no occurrence of abnormality, the routine goes to step 2 wherein the above regular control at the time of normality is carried out. When it is diagnosed that an abnormality occurs, the routine goes to step 3.

Figure 10A:
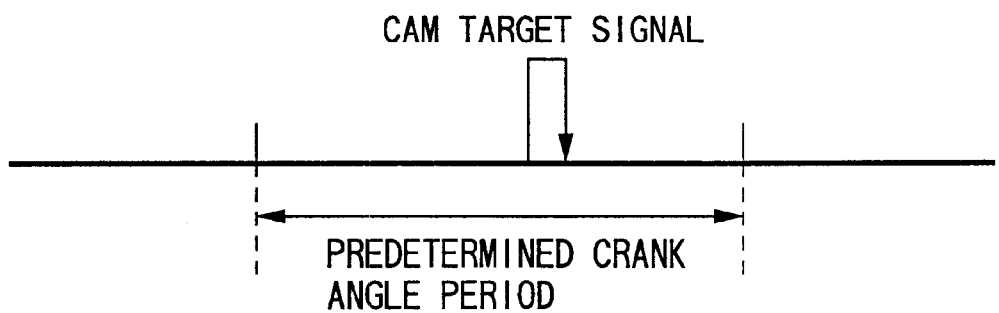
FIG. 10A, FIG. 10B is a diagram showing a state of normality and a slight abnormality of a cam target signal of the valve timing control mechanism.

In step 3, it is judged whether or not the cause of the occurring abnormality is a breakdown of cam target signal. The cam target signal is a signal generated by detecting projections or hollows formed on the rotation member of VTC in order to detect the rotation phase of the camshaft. If the system is normal, the cam target signal is generated one time within a predetermined crank angle period (see FIG. 10A). Accordingly, when the cam target signal is not generated within the predetermined crank angle period, it is diagnosed that there is a breakdown of signal line for outputting the cam target signal. Since the breakdown of cam target signal is a stationary failure, even if a feedback control to the target angle is carried out, there is no guarantee of a normal control. Therefore, the routine goes to step 4, wherein a duty ratio VTCDTY=0 and the fail-safe control to fix the rotation phase of the camshaft to the most retarded position is carried out.

When in step 3, it is judged that there is no breakdown of cam target signal, the routine goes to step 5, wherein it is judged whether or not the abnormality is caused by a breakdown of solenoid for driving the electromagnetic switching valve 45. The diagnosis of the solenoid breakdown is executed by a circuit for diagnosing a solenoid breakdown disposed in an ECU (engine control unit). Namely, a solenoid check signal is set to become a high level H when the duty ratio VTCDTY=0%, and to become a low level L when the duty ratio VTCDTY=100%, during the system is normal. On the other hand, the solenoid check signal is set to become the low level L when the duty ratio VTCDTY=0%, and to become the high level H when the duty ratio VTCDTY=100%, during the system is abnormal. When the number of times that the system falls in abnormal state becomes a predetermined value or above, it is judged that the solenoid has a breakdown failure. Since the breakdown of solenoid is also a stationary failure, even if the feedback control to the target value is carried out, there is no guarantee of a normal control. Therefore, the routine goes to step 4, wherein the duty ratio VTCDTY=0 and the fail-safe control to fix the rotation phase of the camshaft to the most retarded position is carried out.

On the other hand, in the case of no breakdown of cam target signal or no breakdown of solenoid, it is diagnosed that it is a temporal abnormality to be back to normal in a short time or it is a slight abnormality that the feedback control to the target angle is possible, although taking time and having a bad response.

Figure 10B:
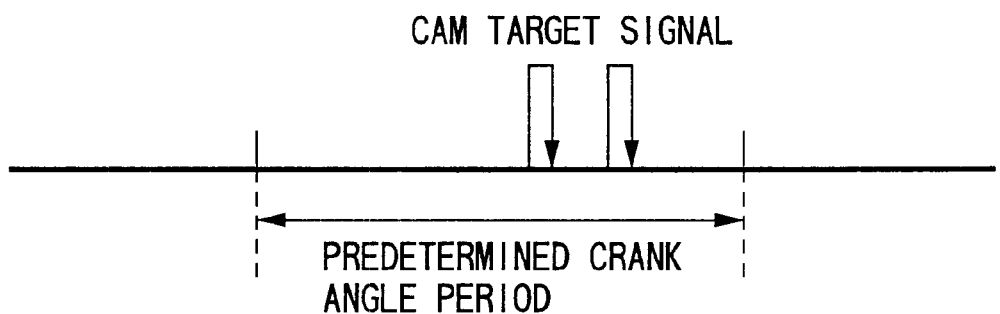

For example, when the cam target signal is generated two or more times within the predetermined crank angle period (see FIG. 10B), it is diagnosed that the cam target signal has an instantaneous breakdown and noises. Besides, there are a diagnosis of VTC offset, an offset diagnosis during idling, and a diagnosis of VTC driving abnormality. When a state that the deviation PEER exceeds an allowable value lasts for a set time or more, it is diagnosed that there is an abnormality caused by a bad response.

When it is diagnosed as a slight abnormality as above, the routine goes to step 6, wherein both the P component gain and the velocity gain d=0, and the linear term=0.

In step 7, the feedback control is carried out by calculating the control amount UDTY (feedback correction component). Since in step 6, the linear term UL=0, UDTY=UNL. So the feedback control is carried out only by the non-linear term UNL.

The control gain k of the non-linear term UNL is limited to a value that hunting does not occur when VTC reaches the target angle. Since a robust characteristic of sliding mode control depends on the non-linear term UNL, the control gain k is set to be as large as possible within the limited range.

Since the non-linear term UNL is subjected to a chattering prevention (hunting prevention) process (adding the chattering prevention coefficient δ to a denominator), it becomes larger when the PEER is large and it becomes smaller when the PEER is small.

Figure 11A:
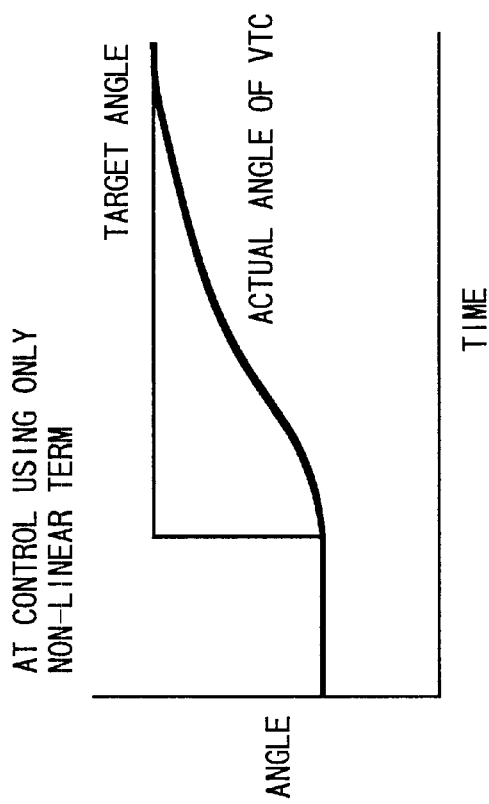
FIG. 11A, FIG. 11B is a diagram showing a comparison between a fail-safe control operation and a normal control operation of the valve timing control mechanism.
Figure 11B:
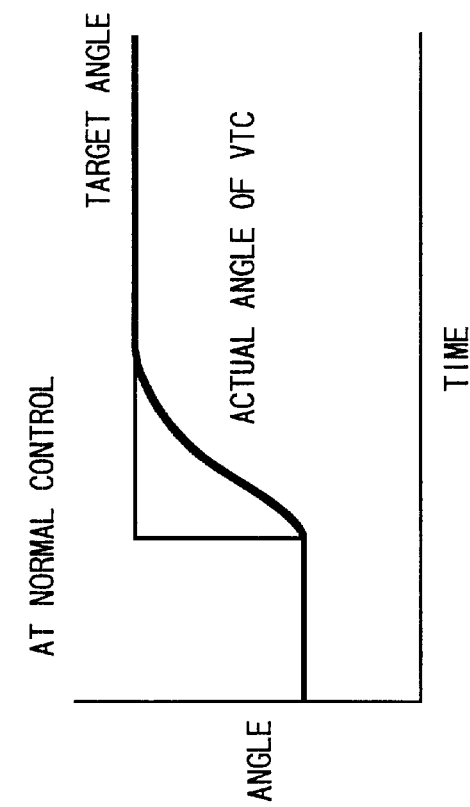

As understood from the above description, in the fail-safe control mentioned above, when the feedback control is carried out by calculating the feedback correction amount UDTY only using the non-linear term UNL, a slight amount of oil enters into the oil chamber of VTC going slightly beyond the dead band of switching valve. From the opposite oil chamber (for example, the oil chamber of retard side, when oil flows into the oil chamber of advance side), oil flows out into a drain. Accordingly, VTC operates at a slower velocity compared with the normal control (see FIG. 11).

In this way, the feedback control is carried out while reducing the control velocity. It brings a filter function against an instantaneous breakdown, noises, and fluctuations, and finally, a desired performance can be secured by converging to the target angle while restraining abrupt fluctuations.

The whole contents of Japanese Patent Application No. 11-351142 are incorporated herein by the reference.

What is claimed is:

1. A fail-safe control apparatus of a sliding mode control system comprising:
   a controller in which a control amount composed of a linear term and a non-linear term is calculated by a sliding mode control to feedback control a control object to a target value, wherein said controller judges whether or not an abnormality occurs in said sliding mode control system, and a feedback control is carried out by using only the non-linear term calculated by said sliding mode control when an abnormality is judged to occur.

2. A fail-safe control apparatus of a sliding mode control system according to claim 1, wherein said feedback control is carried out using only said non-linear term only when it is judged that a predetermined abnormality occurs in said sliding mode control system.

3. A fail-safe control apparatus of a sliding mode control system according to claim 2, wherein said predetermined abnormality comprises an abnormality which occurs transiently.

4. A fail-safe control apparatus of a sliding mode control system according to claim 2, wherein said predetermined abnormality comprises an abnormality that a deviation between a target value and an actual value of said control object exceeds a threshold value for a predetermined time or more.

5. A fail-safe control apparatus of a sliding mode control system according to claim 1, wherein said control object is a rotation phase of a camshaft relative to a crankshaft in an internal combustion engine, and the opening and closing timing of an intake valve and an exhaust valve is controlled variably and continuously by feedback controlling said rotation phase to said target value.

6. A fail-safe control apparatus of a sliding mode control system according to claim 5, wherein said feedback control is carried out using only said non-linear term only when a slight abnormality occurs in said sliding mode control system, and the rotation phase of said camshaft is fixed to the most retarded side when a crucial abnormality occurs in said sliding mode control system.

7. A fail-safe control method of a sliding mode control system, comprising the steps of:

calculating a control amount composed of a linear term and a non-linear term by a sliding mode control to feedback control a control object to a target value;

judging whether or not an abnormality occurs in said sliding mode control system; and carrying out a feedback control by using only the non-linear term calculated by said sliding mode control when an abnormality is judged to occur.

8. A fail-safe control method of a sliding mode control system according to claim 7, wherein said feedback control is carried out using only said non-linear term only when it is judged that a predetermined abnormality occurs in said sliding mode control system.

9. A fail-safe control method of a sliding mode control system according to claim 8, wherein said predetermined abnormality comprises an abnormality which occurs transiently.

10. A fail-safe control method of a sliding mode control system according to claim 8, wherein said predetermined abnormality comprises an abnormality that a deviation between a target value and an actual value of said control object exceeds a threshold value for a predetermined time or more.

11. A fail-safe control method of a sliding mode control system according to claim 7, wherein said control object is a rotation phase of a camshaft relative to a crankshaft in an internal combustion engine, and the opening and closing timing of an intake valve and an exhaust valve is controlled variably and continuously by feedback controlling said rotation phase to said target value.

12. A fail-safe control method of a sliding mode control system according to claim 11, wherein said feedback control is carried out using only said non-linear term only when a slight abnormality occurs in said sliding mode control system, and the rotation phase of said camshaft is fixed to the most retarded side when a crucial abnormality occurs in said sliding mode control system.

* * * * *